United States Patent [19]

Yang et al.

[11] 4,059,676

[45] Nov. 22, 1977

[54] DECOMPOSITION OF HALOGENATED ORGANIC COMPOUNDS

[75] Inventors: Kang Yang; James D. Reedy, both of Ponca City, Okla.

[73] Assignee: Continental Oil Company, Ponca City, Okla.

[21] Appl. No.: 696,168

[22] Filed: June 14, 1976

Related U.S. Application Data

[63] Continuation-in-part of Ser. No. 689,614, May 24, 1976, abandoned.

[51] Int. Cl.² .............................................. B01D 53/34
[52] U.S. Cl. .................................. 423/240; 423/245; 423/481; 423/502
[58] Field of Search ............... 423/240, 241, 245, 481, 423/502

[56] References Cited

U.S. PATENT DOCUMENTS 3,437,445   4/1969   Hay et al. ............................. 423/502
3,972,979   8/1976   Kageyama ........................... 423/240

*Primary Examiner*—Earl C. Thomas
*Attorney, Agent, or Firm*—Bayless E. Rutherford, Jr.

[57] ABSTRACT

A method for decomposing halogenated organic compounds which comprises: (a) heating the halogenated organic compound to a temperature above about 300° C. and (b) contacting the heated organic compound with a catalytic amount of ruthenium-platinum catalyst in the presence of an oxidizing agent at a temperature of at least about 350° C.

16 Claims, No Drawings

DECOMPOSITION OF HALOGENATED ORGANIC COMPOUNDS

CROSS-REFERENCE TO RELATED APPLICATIONS

This application is a continuation-in-part of Ser. No. 689,614 filed May 24, 1976, and now abandoned.

FIELD OF THE INVENTION

Briefly, the invention is in the field of decomposing halogenated organic compounds. More specifically, the invention is in the field of removal of vinyl halides (e.g. by the decomposition thereof) from gas streams.

BACKGROUND

Polyvinylchloride, which is prepared by the polymerization of vinyl chloride, is one of the most useful of modern commercial plastics. Unfortunately, it is now believed to be well-established that vinyl chloride in sufficient concentration is harmful. In view of this, extensive research is now being conducted on methods of decomposing, or removing, vinyl chloride. Our invention is directed to a method for decomposing a vinyl halide, such as vinyl chloride. More specifically, our invention is directed to a method of decomposing a vinyl halide, such as vinyl chloride, when present in an oxygen-containing gas stream such as air.

While decomposition of vinyl chloride is an important use for our method it is readily apparent that the method is also useful for decomposing other halogenated organic compounds, as defined hereinafter.

PRIOR ART

The following prior art is believed to be of possible pertinency:

Ruthenium is known as a catalyst for the destructive oxidation of organic compounds such as sucrose, glycine and eicosane. (1)

The catalytic cleavage of ethyl chloride by platinum metal is described in two references. (2,3)

However, it is generally acknowledged that halogen-containing compounds are poisonous to noble metal oxidation catalysts. (4,5,6)

1. Dokl. Akad. Nank SSSR 200 (5), 1105-b (1971) C.A. 76:14867u
2. Chemiker Ztz 88 (1), 15–16 (1964) C.A. 60:7503b
3. Z. Electrochem. 58, 762-6, (1954) C.A. 49:6708e
4. "Industrial Pollution Control Handbook" edited by H. F. Lund, McGraw-Hill, 1971, Chapter 5
5. ibid (4) — Chapter 7
6. ibid (4) — Chapter 14

U.S. Pat. No. 3,453,073 teaches that halogen values in chlorinated hydrocarbons are recovered by passing a gaseous mixture of the chlorinated hydrocarbons, water and oxygen through a bed of a catalyst to form hydrogen chloride which is then recovered. While the patent teaches a multitude of catalysts it does not teach ruthenium.

U.S. Pat. No. 3,845,191 teaches a process for the oxidation of a halocarbon comprising chlorofluorocarbons which comprises contacting the halocarbon with oxygen and a member selected from the class consisting of oxides of calcium, aluminum, barium, magnesium, iron, nickel and mixtures thereof at from 750° C. to 1100° C. Again, this patent does not teach ruthenium as a catalyst for the decomposition of halogenated organic compounds.

U.S. Pat. No. 3,933,980 teaches a method for reducing the amount of ethylenically unsaturated chlorinated hydrocarbons in gaseous mixtures. Briefly, the method comprises contacting a gas stream containing the ethylenically unsaturated chlorinated hydrocarbons with ozone. The process does not use a catalyst.

British Pat. No. 1,046,313 teaches a process for preparing chlorine, bromine or iodine from the compounds of these halogens with hydrogen. Briefly, the process comprises the oxidation of the hydrogen halide in the gaseous phase using ruthenium compounds as the catalyst. Inasmuch as oxidation of hydrogen halides and organic halides normally use different catalysts they are considered, by people skilled in the art, as being entirely non-analogous reactions.

In summary, the art does not teach, nor recognize, the advantages obtained by preheating the feedstock as described by applicants' invention. Nor does it teach the specific combination of catalysts used in Applicants' invention. The advantages of the catalyst combination will be described more fully hereinafter.

BRIEF SUMMARY OF THE INVENTION

Broadly stated, the present invention is directed to a method for decomposing halogenated organic compounds wherein the method comprises:

a. heating the halogenated organic compound to a temperature above about 300° C., b. contacting the heated organic compound with a catalytic amount of ruthenium-platinum catalyst in the presence of an oxidizing agent at a temperature of at least about 350° C.

In one aspect, the present invention is directed to a method for decomposing halogenated organic compounds wherein the method comprises:

a. heating a gaseous stream comprising said halogenated organic compounds and an oxidizing gas to a temperature above about 300° C., b. passing the heated gaseous stream of step (a) through a heated zone wherein it contacts ruthenium-platinum catalyst at a temperature of at least about 350° C.

In a preferred embodiment the halogenated organic compound is vinyl chloride and the oxidizing gas is air or a mixture of nitrogen and oxygen.

DETAILED DESCRIPTION

Materials

Suitable halogenated organic compounds for use in our process are those containing 1 to 4 carbon atoms and containing at least as many hydrogen atoms as halogen atoms. Also suitable are mixtures of halogenated organic compounds containing 1 to 4 carbon atoms wherein the total number of hydrogen atoms in the mixture is at least equal to the total number of halogen atoms. Particularly suitable halogenated organic compounds are unsaturated organic compounds such as the vinyl halides and mixtures of $C_1$ halogenated compounds and $C_2$ halogenated compounds containing vinyl halides, wherein in said mixtures the total number of hydrogen atoms is at least equal to the total number of halogen atoms. The preferred halogenated organic compounds are those wherein the halogen is chlorine. Using chlorine as a typical halogen, examples of suitable halogenated organic compounds are materials represented by the formulae $CH_3Cl$, $CH_2Cl_2$, $CH_3CHCl_2$, $CH_2Cl\ CH_2Cl$, $CH_2 = CHCl$, $CH_3CH = CHCl$, $CH_3CH_2CH = CHCl$.

From the foregoing description it is understood that the halogenated organic compounds contain only carbon, hydrogen and halogen.

The catalyst employed in the method of this invention is a combination of ruthenium and platinum. The catalyst may be in the form of finely divided metallic ruthenium and divided metallic platinum, or each of the metals individually supported on a non-oxidizing carrier which may be the same or different, or both metals supported on the same non-oxidizing carrier (commonly referred to as a bimetallic catalyst). When the metals are supported on a carrier they may be coated or impregnated and will usually contain about 0.01 to 1 percent by weight of the metal although higher or lower amounts may be employed. The non-oxidizing carriers may be any of those known in the art such as alumina, $SiO_2$, $SiC$, $Fe_2O_3$ and kieselguhr including diatomaceous earth.

Catalysts in these forms are readily available from commercial sources and are well known in the art.

As will be understood by those skilled in the art, one metal catalyst may be employed as a finely divided metal and the other as a supported metal, or both metals may be employed in a finely divided form or supported on carriers, or a bimetallic catalyst may be used alone. Additionally, if the metals are either in a finely divided metallic form or individually supported on carriers they may be loaded in the reaction zone in admixture or in sequential layers. Some unique effects may be achieved with the latter loading technique in that if the halogenated organic compounds sequentially contact first the platinum followed by the ruthenium the decomposition products in the effluent gas will contain an appreciable quantity of elemental halogen whereas the reverse sequential order will result in a significant quantity of hydrogen halide and lower elemental halogen. This is discussed more fully hereinafter.

Catalysts wherein the metal is impregnated on alumina are preferred and are available from Engelhard Industries, Newark, New Jersey.

With regard to relative amounts of the platinum catalyst and the ruthenium catalyst, a suitable amount is in the range of 1 to 20 parts of platinum catalyst per part of ruthenium catalyst. A more suitable amount is in the range of 1 to 10 parts of platinum catalyst per part of ruthenium catalyst. Preferably the amount of platinum catalyst is in the range of 2 to 5 parts per part of ruthenium catalysts. All of the foregoing ranges are based on the amount of active (i.e. platinum or ruthenium).

Suitable oxidizing agents include air, oxygen, and mixtures of nitrogen and oxygen.

PROCESS CONDITIONS

An important feature of our process is heating the halogenated organic compound prior to passing it into the reactor zone where it is contacted with the catalysts. The oxidation of the halogenated organic compound in the presence of the catalysts is exothermic but does not proceed spontaneously. In order that the reaction occur when contacted with the catalysts it is necessary to have the halogenated organic compound at some minimum elevated temperature before contacting with the catalysts. (Persons skilled in this art often call this step "preheating.") This particular heating step should be conducted using a temperature above about 300° C. more suitably above 320° C., and preferably above 340° C. The maximum temperature for this heating step is about 600° C., preferably about 500° C.

We have found that this preheating improves the life of the catalyst and provides a more efficient decomposition of the halogenated organic compound. Moreover, it has been found that attempts to conduct the process by simply heating the reactants to the necessary temperatures in the reaction zone without preheating results in the catalyst being rendered ineffective due to deposition of carbon and carbon-containing compounds. This is particularly true when vinyl chloride is the halogenated organic compound being decomposed.

The heated halogenated organic compound is then passed to a reaction zone containing the catalysts. Since the reaction is exothermic, the temperature in the reaction zone varies, with the highest temperature suitably being in the range of about 350° to about 600° C., preferably in the range of about 400 to about 500° C. (The highest temperature in the reaction zone is often referred to as "hot spot" temperature).

The order in which the catalysts are placed in the reactor affects the type of decomposition products. In the following discussion the terms "first" and "second" refer to the order in which the catalysts are contacted by the halogenated organic compound and oxidizing agent. Placing the platinum catalyst first and the ruthenium catalyst second results in a product having a very low concentration of vinyl chloride but an appreciable amount of chlorine. Placing the ruthenium catalyst first and the platinum catalyst second results in a product having low concentration of vinyl chloride and a substantially lower concentration of chlorine than when the catalysts are placed in a reverse order.

Our process is particularly suitable for use with air (or a mixture of nitrogen and oxygen) containing the halogenated organic compound (e.g. vinyl chloride) wherein the halogenated organic compound can be present over a wide range. In order to provide a more specific teaching the GHSV (gas hourly spaced velocity) of gas including halogenated organic compound to catalyst can be in the range of 100 to 100,000 l/hr.

While it is believed to be implied from the foregoing it may be well to state that our invention is also applicable to processes wherein liquid halogenated organic compounds are vaporized and injected into the oxidizing gas.

Pressure is not critical, it being understood that conducting the process in liquid phase requires that it be under pressure.

A particularly unique feature of our process is that the catalysts have a long life while still providing an effluent containing only a small amount of vinyl chloride. For example in laboratory tests the catalyst has been effective for at least 360 hours of continuous operation.

If desired the effluent gas from our process can be passed through a scrubber to absorb the decomposition products.

In order to illustrate the nature of the present invention still more clearly the following examples will be given. It is to be understood, however, that the invention is not to be limited to the specific conditions or details set forth in these examples except insofar as such limitations are specified in the appended claims.

In the following examples the reactor, which was a 11 cm. length of 1.3 cm. diameter stainless steel tube, was placed in a Lindburg furnace. A preheater, 20 cm.

long 1.3 cm. diameter stainless steel tube, preceded the reactor.

The catalysts were commercial catalysts obtained from Engelhard. The platinum catalyst comprised 3 mm $Al_2O_3$ spheres containing 0.5 percent (wt.) platinum (coating). The ruthenium catalyst comprised 1.6 mm $Al_2O_3$ spheres containing 0.5 percent by weight ruthenium.

The feed gas composition in all examples was the following (volume percent): $N_2$ — 86.8; $O_2$ — 11.2; $C_2H_5Cl$ — 1.7; $C_2H_3Cl$ — 0.13; $ClC_2H_4Cl$ — 0.079; $Cl_2$ — 0.079; $CHCl_3$ — 0.033; $CCl_4$ — 0.018.

The composition of outlet gas was analyzed chromatographically with a flame ionization detector.

EXAMPLE 1

This example illustrates the results obtained using 5 grams of platinum-coated alumina catalyst alone in the reactor. Four runs were made using varying preheater and reactor temperatures. The GHSV in all runs was 2,400 hr$^{-1}$. The results are shown in Table I.

Table I

| Run No. | Pre-heater Temperature °C | Maximum Reactor Temperature °C | Vinyl Chloride ppmv | $Cl_2$ (%)[a] |
|---|---|---|---|---|
| A | 343 | 412 | 4.0 | 2.2 |
| B | 338 | 406 | 6.0 | 1.3 |
| C | 322 | 400 | 9.0 | <1 |
| D | 275 | Catalyst Deactivates* | | |

[a]Percent - based on chlorine present in feed
*This shows that lower preheater temperatures are not effective

EXAMPLE 2

This example illustrates the results obtained when the gases contact the platinum-coated catalyst prior to contacting the ruthenium-coated catalyst. Four grams of platinum-coated catalyst followed by one gram of ruthenium-coated catalyst were placed in the reactor. Four runs were made at a GHSV of 2,400 hr$^{-1}$ and four runs were made at a GHSV of 4,800 hr$^{-1}$. The results are shown in Table II.

Table II

| Run No. | Pre-heater Temperature °C | Maximum Reactor Temperature °C | Vinyl Chloride ppmv | $Cl_2$ (%)[a] |
|---|---|---|---|---|
| GHSV 2,400 hr$^{-1}$ | | | | |
| A | 343 | 402 | <0.2 | 26.3 |
| B | 338 | 389 | <0.2 | 22.4 |
| C | 322 | 381 | <0.2 | 16.7 |
| D | 275 | Catalyst Deactivates | | |
| GHSV 4,800 hr$^{-1}$ | | | | |
| E | 343 | 457 | <0.2 | 25.6[a] |
| F | 338 | 438 | <0.2 | 22.4 |
| G | 322 | 428 | <0.2 | 14.4 |
| H | 275 | Catalyst Deactivates | | |

[a]Percent - based on chlorine present in feed.

EXAMPLE 3

This example illustrates the results obtained when the gases contact the ruthenium-coated catalyst prior to contacting the platinum-coated catalyst. One gram of ruthenium-coated catalyst followed by four grams of platinum-coated catalyst were placed in the reactor. Four runs were made at a GHSV of 2,400 hr$^{-1}$ and four runs were made at a GHSV of 4,800 hr$^{-1}$. The results are shown in Table III.

Table III

| Run No. | Pre-heater Temperature °C | Maximum Reactor Temperature °C | Vinyl Chloride ppmv | $Cl_2$ (%)[a] |
|---|---|---|---|---|
| GHSV 2,400 hr$^{-1}$ | | | | |
| A | 343 | 408 | <0.2 | 4.8 |
| B | 338 | 398 | <0.4 | <1 |
| C | 322 | 393 | <0.4 | <1 |
| D | 275 | Catalyst Deactivates | | |
| GHSV 4,800 hr$^{-1}$ | | | | |
| E | 343 | 463 | 0.4 | 10.6 |
| F | 338 | 445 | 4.0 | 3.8 |
| G | 322 | 440 | 12.0 | 1.8 |
| H | 275 | Catalyst Deactivates | | |

[a]Percent - based on chlorine present in feed.

Thus, having described the invention in detail, it will be understood by those skilled in the art that certain variations and modifications may be made without departing from the spirit and scope of the invention as defined herein and in the appended claims.

We claim:

1. A method for decomposing chlorinated organic compounds, said chlorinated orgainc compounds containing 1 to 4 carbon atoms and containing at least as many hydrogen atoms as chlorine atoms, said method comprising:
   a. heating the chlorinated organic compounds to a temperature above about 300° C., and
   b. then contacting the heated organic compound with a catalytic amount of ruthenium-platinum catalyst in the presence of an oxidizing agent, selected from the group consisting of air, oxygen, and mixtures of nitrogen and oxygen, at a temperature of at least about 350° C., said catalysts being present in the range of 1 to 20 parts of platinum per part of ruthenium.

2. The process of claim 1 wherein the chlorinated organic compounds are selected from the group consisting of vinyl chloride and mixtures of $C_1$ chlorinated compounds and $C_2$ chlorinated compounds containing vinyl chloride wherein the total number of hydrogen atoms in the mixture is at least equal to the total number of chlorine atoms.

3. The process of claim 2 wherein the chlorinated organic compound is vinyl chloride.

4. The process of claim 3 wherein the ruthenium-platinum catalyst comprises ruthenium supported on a non-oxidizing carrier and platinum supported on a non-oxidizing carrier.

5. The process of claim 4 wherein the temperature in step (a) is above 320° C. and the temperature in step (b) is in the range of about 350° to about 600° C.

6. The process of claim 5 wherein the temperature of step (a) is above 340° C. and the temperature of step (b) is in the range of about 400° to about 500° C.

7. The process of claim 3 wherein the ruthenium-platinum catalyst comprises ruthenium impregnated on alumina or Kieselguhr and platinum impregnated on alumina or kieselguhr.

8. The process of claim 3 wherein the ruthenium-platinum catalyst comprises a bimetallic catalyst wherein both ruthenium and platinum are supported on a single non-oxidizing carrier.

9. The process of claim 3 wherein the ruthenium-platinum catalyst comprises finely divided metallic ruthenium and finely divided metallic platinum.

10. The process of claim 4 wherein the heated organic compound is contacted first with the ruthenium catalyst and then with the platinum catalyst.

11. The process of claim 4 wherein the heated organic compound is contacted first with the platinum catalyst and then with the ruthenium catalyst.

12. A method for substantially reducing the amount of chlorinated organic compounds in a gaseous stream containing chlorinated organic compounds by decomposing said chlorinated organic compounds, said chlorinated organic compounds containing 1 to 4 carbon atoms and containing at least as many hydrogen atoms as chlorine atoms, said method comprising:
 a. heating a gaseous stream comprising said chlorinated organic compounds and an oxidizing gas selected from air and a mixture of nitrogen and oxygen to a temperature above about 300° C., and
 b. then passing the heated gaseous stream of step (a) through a heated zone having a temperature of at least about 350° C. wherein it contacts a catalytic amount of a ruthenium-platinum catalyst said catalysts being present, based on the noble metal content thereof, in the range of 1 to 20 parts of platinum per part of ruthenium.

13. The process of claim 12 wherein the chlorinated organic compounds are selected from the group consisting of vinyl choride and mixtures of $C_1$ chlorinated compounds and $C_2$ chlorinated compounds containing vinyl chloride wherein the total number of hydrogen atoms in the mixture is at least equal to the total number of chlorine atoms.

14. The process of claim 13 wherein the chlorinated organic compound is vinyl chloride.

15. The process of claim 14 wherein the temperature in step (a) is above 320° C. and the temperature in step (b) is in the range of about 350° to about 600° C.

16. The process of claim 15 wherein the temperature of step (a) is above 340° C. and the temperature of step (b) is in the range of about 400° to about 500° C.

* * * * *